(12) United States Patent
Kumar et al.

(10) Patent No.: US 7,783,515 B1
(45) Date of Patent: Aug. 24, 2010

(54) ITEMIZED RECEIPT TRACKING SYSTEM

(75) Inventors: Puneet Kumar, South Lake, TX (US); Debashis Ghosh, Charlotte, NC (US); Matthew Brian Cincera, Charlotte, NC (US); Sudeshna Banerjee, Waxhaw, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 12/413,324

(22) Filed: Mar. 27, 2009

(51) Int. Cl.
*G06Q 20/00* (2006.01)
*G06Q 40/00* (2006.01)
*G06Q 30/00* (2006.01)
*G06F 17/30* (2006.01)

(52) U.S. Cl. .............. 705/16; 705/10; 705/40; 705/26; 705/43; 705/35

(58) Field of Classification Search ............. None
See application file for complete search history.

(56) References Cited

U.S. PATENT DOCUMENTS

| | | | |
|---|---|---|---|
| 5,739,512 | A | 4/1998 | Tognazzini |
| 5,974,396 | A | 10/1999 | Anderson et al. |
| 6,394,341 | B1 | 5/2002 | Mäkipää et al. |
| 6,487,540 | B1 | 11/2002 | Smith et al. |
| 7,013,290 | B2 | 3/2006 | Ananian |
| 2002/0062249 | A1 | 5/2002 | Iannacci |
| 2002/0116249 | A1 | 8/2002 | Ellinger et al. |
| 2002/0152123 | A1 | 10/2002 | Giordano et al. |
| 2002/0188561 | A1* | 12/2002 | Schultz ................ 705/40 |
| 2003/0018550 | A1 | 1/2003 | Rotman et al. |
| 2003/0182204 | A1* | 9/2003 | Rhee ................... 705/26 |
| 2003/0217005 | A1* | 11/2003 | Drummond et al. ...... 705/43 |
| 2004/0220964 | A1 | 11/2004 | Shiftan et al. |
| 2006/0289621 | A1 | 12/2006 | Foss, Jr. et al. |
| 2006/0293956 | A1 | 12/2006 | Walker et al. |
| 2007/0069013 | A1 | 3/2007 | Seifert et al. |
| 2007/0244741 | A1* | 10/2007 | Blume et al. ............. 705/10 |
| 2008/0091528 | A1 | 4/2008 | Rampell et al. |
| 2008/0133325 | A1 | 6/2008 | De et al. |
| 2008/0162279 | A1 | 7/2008 | Hershkovitz et al. |

OTHER PUBLICATIONS

U.S. Appl. No. 12/234,167, filed Sep. 19, 2008.
U.S. Appl. No. 12/418,941, filed Apr. 6, 2009.
U.S. Appl. No. 12/430,475, filed Apr. 27, 2009.
International Search Report and the Written Opinion of the International Searching Authority mailed May 27, 2010 for International Application No. PCT/US2010/028828.

* cited by examiner

*Primary Examiner*—F. Ryan Zeender
*Assistant Examiner*—Denisse Ortiz Roman
(74) *Attorney, Agent, or Firm*—Michael A. Springs; Moore & Van Allen PLLC

(57) ABSTRACT

Embodiments of the present invention are directed to apparatuses, systems, methods, and computer program products for: (1) receiving transaction data from a transaction involving a consumer, where the transaction data comprises product-level information; (2) storing the transaction data in memory; and/or (3) posting the transaction data to an account accessible to the consumer.

45 Claims, 4 Drawing Sheets

ITEMIZED RECEIPT TRACKING SYSTEM

FIELD

In general, embodiments of the present invention relate to apparatuses, systems, methods, and computer program products for receiving, storing, and/or analyzing transaction data, and more particularly, for receiving, storing, and/or analyzing itemized receipts from consumer transactions.

BACKGROUND

In any given year, a single consumer typically accumulates a large number of standard purchase receipts that memorialize the consumer's transactions. All too often, however, the consumer does not have an effective method by which to store and/or manage those receipts. Over time, the receipts may become misplaced, damaged, or even destroyed, all of which impedes or prevents the consumer from being able to find and use a particular receipt when needed. This is particularly so with paper receipts, which are relatively small and not very durable. Without a meaningful system for storing and/or managing these and other forms of receipts, consumers may have difficulty tracking their purchases and/or performing common financial tasks, such as balancing their checkbooks, filing their taxes, and/or preparing a budget. Accordingly, it would be desirable if there were an apparatus, system, method, and/or computer program product to help consumers overcome these and other difficulties in storing and/or managing receipts from transactions.

SUMMARY OF SELECTED EMBODIMENTS OF THE INVENTION

Embodiments of the present invention relate to apparatuses, systems, methods, and computer program products for receiving, storing, and/or analyzing transaction data, and more particularly, for receiving, storing, and/or analyzing itemized receipts from consumer transactions. For example, in one embodiment, a method is provided for: (1) receiving transaction data from a transaction involving a consumer, where the transaction data comprises product-level information; (2) storing the transaction data in memory; and (3) posting the transaction data to an account accessible to the consumer. In another embodiment, the method further comprises assigning the transaction data to a posted transaction in the account.

In one embodiment, the transaction data comprises merchant-level information and the posted transaction comprises merchant-level information. In another embodiment, the assigning the transaction data to the posted transaction in the account further comprises assigning the transaction data to the posted transaction in the account based at least partially on a comparison of the merchant-level information in the transaction data to the merchant-level information in the posted transaction.

In one embodiment, the transaction data comprises transaction amount-level information and the posted transaction comprises transaction amount-level information. In another embodiment, the assigning the transaction data to the posted transaction in the account further comprises assigning the transaction data to the posted transaction in the account based at least partially on a comparison of the transaction amount-level information in the transaction data to the transaction amount-level information in the posted transaction.

In one embodiment, the assigning the transaction data to the posted transaction in the account further comprises posting the transaction data proximate the posted transaction in the account. In another embodiment, the transaction data is received in the form of a receipt. In yet another embodiment, the receipt is a standard purchase receipt printed on paper. In another embodiment, the receiving the transaction data from a transaction involving a consumer further comprises receiving the transaction data from the consumer. In another embodiment, the storing and posting of the transaction data further comprises storing and posting the product-level information.

In one embodiment, the method further comprises communicating the transaction data to another system that is configured to determine a trend in consumer behavior based at least partially on the transaction data. In another embodiment, the method further comprises determining a trend in consumer behavior based at least partially on the transaction data. In still another embodiment, the account is an online banking account. In another embodiment, the storing of the transaction data comprises storing product-level information in memory such that a record is created of specific products purchased by the consumer over a period of time.

In one embodiment, the method further comprises organizing the product-level information in the account by spending category. In another embodiment, the method further comprises locating transaction data posted to the account based at least partially on a consumer-initiated search query. In yet another embodiment, the product-level information comprises one or more codes that uniquely identify one or more products involved in the transaction. In still another embodiment, the product-level information comprises at least one of a product description, a product quantity, and a product price.

In one embodiment, a system is provided comprising a communication device configured to receive transaction data from a transaction involving a consumer, and a processing device operatively connected to the communication device and configured to post the transaction data to an account accessible to the consumer. In another embodiment, the transaction data comprises product-level information. In another embodiment, the transaction data is in the form of an electronic receipt.

In one embodiment, an automated teller machine (ATM) comprises the communication device. In another embodiment, the account is an online banking account. In another embodiment, the communication device is further configured to receive the transaction data from the consumer via a computerized apparatus. In still another embodiment, the processing device is further configured to assign the transaction data to a posted transaction in the account.

In one embodiment, the system further comprises a memory device operatively connected to the processor and comprising a computer-readable medium for storing the transaction data, and the processor is further configured to store the transaction data in the memory device. In another embodiment, the communication device is further configured to send the transaction data to an electronic device of the consumer's choice.

In one embodiment, an online banking method is provided that comprises: (1) receiving an electronic representation of a receipt from a transaction involving a consumer, where the electronic representation of the receipt comprises product-level information; (2) storing the electronic representation of the receipt in memory; and (3) posting the electronic representation of the receipt to an online banking account accessible to the consumer. In another embodiment, the receiving of the electronic representation further comprises receiving the electronic representation from the consumer via the online banking account accessible to the consumer.

In one embodiment, the electronic representation of the receipt is in an image file format. In another embodiment, the electronic representation of the receipt is in a Portable Document Format (PDF). In another embodiment, the consumer is a bank customer. In yet another embodiment, the method further comprises assigning the electronic representation of the receipt to a posted transaction in the online banking account. In another embodiment, the assigning the electronic representation of the receipt to the posted transaction further comprises assigning the electronic representation of the receipt to a location proximate the posted transaction in the online banking account.

In one embodiment, the posting of the electronic representation of the receipt further comprises posting the electronic representation of the receipt to a central location in the online banking account. In another embodiment, the method further comprises assigning the product-level information to a posted transaction in the online banking account. In another embodiment, the assigning the product-level information to the posted transaction further comprises posting the product-level information proximate the posted transaction in the online banking account.

In one embodiment, the method further comprises assigning one or more spending identifiers to the product-level information. In another embodiment, the method further comprises assigning the product-level information to one or more spending categories based at least partially on one or more spending identifiers. In another embodiment, the method further comprises determining a trend in consumer behavior based at least partially on the product-level information.

In one embodiment, a computer program product for electronically storing receipts is provided, where the computer program product comprises a computer-readable storage medium having computer-executable code portions stored therein. In one embodiment, the computer-executable code portions comprise a first code portion configured to receive an electronic representation of a receipt from a transaction involving a consumer, where the electronic representation of the receipt comprises product-level information; a second code portion configured to store the electronic representation of the receipt in a memory device; a third code portion configured to collect the product-level information from the electronic representation of the receipt; and a fourth code portion configured to post the product-level information to an account accessible to the consumer. In another embodiment, the product-level information comprises at least one of a product description, a product quantity, and a product price. In still another embodiment, the fourth code portion is further configured to assign the product-level information to a posted transaction in the account.

In one embodiment, an apparatus for providing a graphical user interface representing an online banking account is provided, where the apparatus comprises a communication interface, computer-executable code portions stored in a computer-readable medium, and a processor configured to execute the computer-executable code portions and use the communication interface to provide the graphical user interface to the display device of a computerized apparatus. In one embodiment, the graphical user interface comprises a file-upload field configured to allow a user of the computerized apparatus to select an electronic file from the computerized apparatus and upload the electronic file to the online banking account, where the electronic file comprises transaction data comprising product-level information. In another embodiment, the graphical user interface further comprises a path to the electronic file after the electronic file has been uploaded.

BRIEF DESCRIPTION OF THE DRAWINGS

Having thus briefly described embodiments of the invention in general terms, reference will now be made to the accompanying drawings, which are not necessarily drawn to scale, and wherein.

DETAILED DESCRIPTION OF EMBODIMENTS OF THE INVENTION

Figure 1:
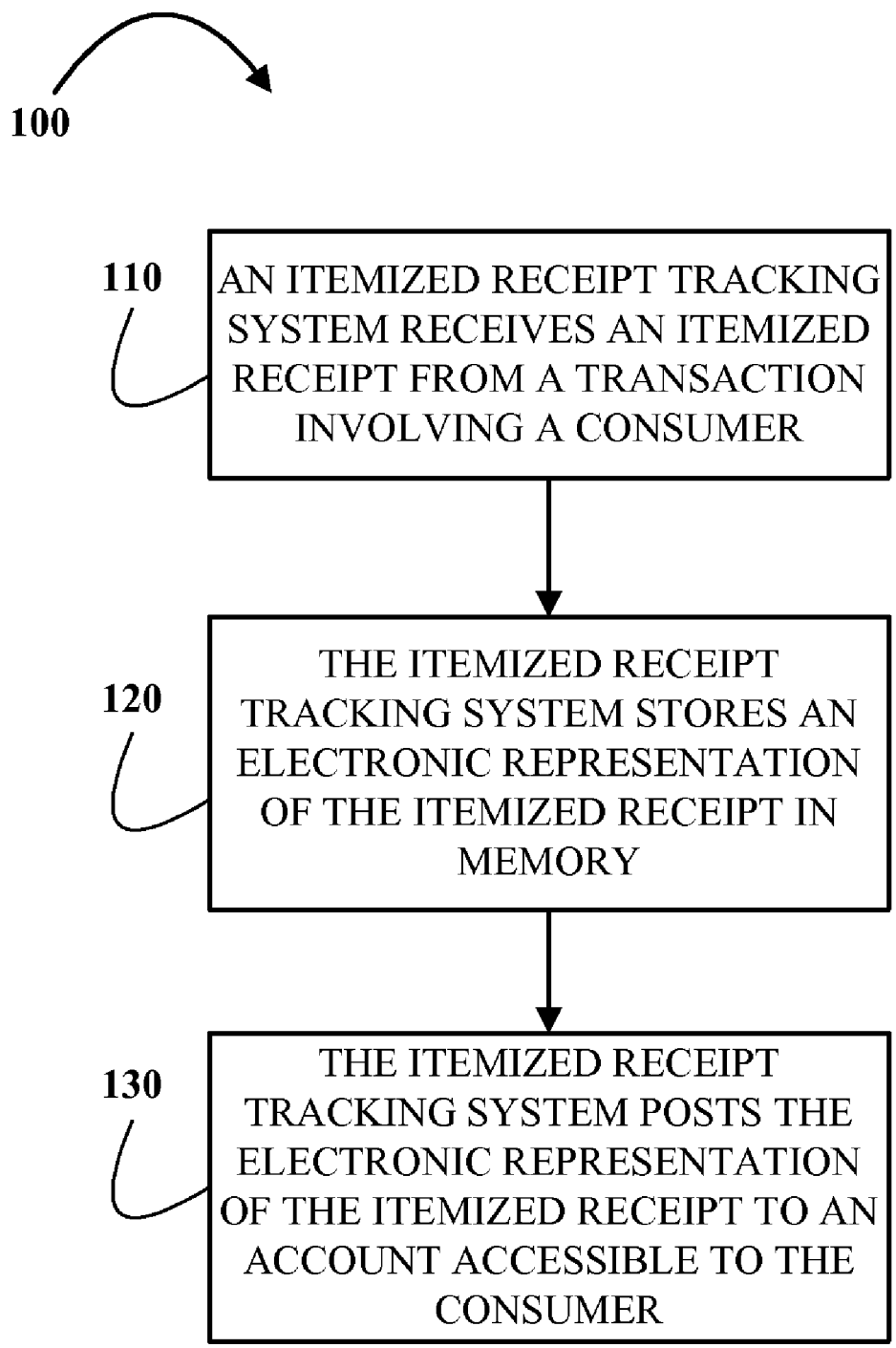
FIG. 1 is a flow diagram illustrating a general process flow of an itemized receipt tracking system, in accordance with an embodiment of the present invention.

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa. Also, as used herein, the term "a" and/or "an" shall mean "one or more," even though the phrase "one or more" is also used herein. Like numbers refer to like elements throughout.

Although some of the embodiments of the invention described herein are generally described as involving a "bank," one of ordinary skill in the art will appreciate that other embodiments of the invention may involve other businesses and/or financial institutions that take the place of, or work in conjunction with, a bank to perform one or more of the processes, steps, and/or events described herein as being performed and/or participated in by a bank.

As will be appreciated by one of ordinary skill in the art in view of this disclosure, the present invention may be embodied as an apparatus (including, for example, a system, device, computer program product, and/or any other type of apparatus), a method (including, for example, a business process, computer-implemented process, and/or any other type of process), and/or any combination of the foregoing. It will be understood that an embodiment of the present invention may take the form of an entirely software embodiment (including firmware, resident software, micro-code, etc.), an entirely hardware embodiment, and/or an embodiment combining software and hardware aspects that may generally be referred to herein as a "system." Furthermore, embodiments of the present invention may take the form of a computer program product having a computer-readable storage medium having computer-executable code portions embodied in the medium.

Any suitable computer-readable storage medium may be utilized. For example, the computer-readable storage medium may be, but is not limited to, an electronic, magnetic, optical, electromagnetic, infrared, or semiconductor system, apparatus, or device. For example, in one embodiment, the computer-readable storage medium comprises a tangible storage medium such as a portable computer diskette, a hard disk, a random access memory (RAM), a read-only memory (ROM), an erasable programmable read-only memory (EPROM or Flash memory), a compact disc read-only memory (CD-ROM), and/or another tangible optical or magnetic storage device.

Computer-executable code portions for carrying out operations of embodiments of the present invention may be written in an object oriented, scripted and/or unscripted programming languages such as Java, Perl, Smalltalk, C++, SAS, SQL, or the like. However, the computer-executable code portions for carrying out operations of embodiments of the present invention may also be written in conventional procedural programming languages, such as the "C" programming language and/or similar programming languages.

Embodiments of the present invention are described below with reference to flowchart illustrations and/or block diagrams of apparatuses, systems, methods, and/or computer program products according to embodiments of the invention. It will be understood that each block having the flowchart illustrations and/or block diagrams, and combinations of blocks in the flowchart illustrations and/or block diagrams, can be implemented by computer-executable code portions. These computer-executable code portions may be provided to a processor of a general purpose computer, special purpose computer, or other programmable data processing apparatus to produce a particular machine, such that the code portions, which execute via the processor of the computer or other programmable data processing apparatus, create a mechanism for implementing the functions/acts specified in the flowchart and/or block diagram block(s).

These computer-executable code portions may also be stored in a computer-readable memory that can direct a computer or other programmable data processing apparatus to function in a particular manner, such that the code portions stored in the computer-readable memory produce an article of manufacture including code portions that implement the function/act specified in the flowchart and/or block diagram block(s).

The computer-executable code portions may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

It will be understood that the term "merchant," as used herein, refers to any person, association, apparatus, and/or any other thing capable of selling, offering for sale, distributing, trading, and/or otherwise dealing in one or more goods and/or services. In some embodiments, the merchant actually produces and/or provides the goods and/or services being sold, while in other embodiments, the merchant distributes the goods and/or services but does not produce and/or provide the goods and/or services.

It will also be understood that the term "product," as used herein, refers to any good and/or service capable of being sold, offered for sale, distributed, traded, and/or otherwise dealt by a merchant. Further, the term "consumer," as used herein, refers to any person, association, apparatus, and/or any other thing capable of buying, using, consuming, and/or acquiring one or more products from a merchant. In some embodiments, a consumer may be a merchant and/or vice versa.

Additionally, it will be understood that the term "transaction data," as used herein, refers to any information relating to the sale, exchange, transfer, and/or any other business dealing involving a product. Exemplary transaction data may include one or more levels of information, such as, for example, product-level information, transaction amount-level information, consumer-level information, and/or merchant-level information. Product-level information may include a description of the product(s), the quantity of product(s), the price of the product(s), the brand or manufacturer of the product, the Universal Product Code (UPC) for a product, and/or a stock-keeping unit (SKU) for the product, etc. Transaction amount-level information refers to the total purchase amount for any given transaction. As understood herein, transaction amount-level information does not include any product-level information. As one example, the typical entry in a credit card statement lists a transaction date, a merchant name, and a total amount paid to that merchant on that transaction date. In that example, the total amount paid to the merchant is the transaction amount-level information.

Consumer-level information may include, for example, the consumer's name and address, bank account number, credit card number, debit card number, and/or the name of the card-issuing bank. Merchant-level information may include, for example, information about the merchant name and location, the location where the exchange occurred, the name and routing number of the merchant's acquiring bank, and/or the account number of the merchant's account, which is held at the acquiring bank.

For illustrative purposes, the transaction data described herein is transaction data obtained from a point-of-sale (POS) transaction where a consumer purchases a product from a merchant using a credit or debit card. It will be appreciated, however, that the transaction data could be obtained from other types of transactions, including those involving automated clearing house (ACH) payments, online bill pay, paper checks, wire transfers, contactless payments, and/or cash payments.

Also for illustrative purposes, the medium by which transaction data is communicated will be described herein as a standard purchase receipt. Typically, a standard purchase receipt serves as a written acknowledgement of a transaction involving a consumer, a merchant, and an exchange of goods and/or services. In this regard, standard purchase receipts usually include at least some consumer-level, merchant-level, transaction amount-level, and/or product-level information about the transaction. Where the receipt includes product-level information, the receipt is typically referred to as an "itemized receipt." It will be understood, however, that in other embodiments, the transaction data and/or itemized receipt may include more or less information about the transaction and/or be communicated in a different form, including, for example, handwritten receipts, gift receipts, electronic receipts (e-receipts) in the form of e-mails, attachments, web pages, etc., and/or any other known type and/or method of conveying information and/or transaction data related to a transaction.

Referring now to FIG. 1, an exemplary flow diagram illustrating a general process flow 100 of an itemized receipt tracking system is provided, in accordance with an embodiment of the present invention. As represented by block 110, the itemized receipt tracking system receives an itemized receipt from a transaction involving a consumer. Then, as represented by block 120, the itemized receipt tracking system stores an electronic representation of the itemized receipt in memory. Further, as represented by block 130, the itemized receipt tracking system posts the electronic representation of the itemized receipt to an account accessible to the consumer.

It will be understood that electronic representations of itemized receipts may include a wide variety of electronic media, including e-receipts, photographs, scanned images, electronic copies, image file formats, such as JPEG, TIFF, etc., and Portable Document Format (PDF), electronic, and/or digital files comprising some or all of the transaction data found in an itemized receipt. As mentioned previously herein, it will also be understood that an itemized receipt tracking system having the flow 100 may be configured to receive, store, and/or post other forms of transaction data having product-level information instead of, or in addition to, itemized receipts.

In some embodiments, an itemized receipt tracking system having the flow 100 is configured to receive an electronic representation of an itemized receipt instead of the physical itemized receipt. However, it should be understood that, in some embodiments, the itemized receipt tracking system having the flow 100 is configured to receive one or more physical itemized receipts. For example, a consumer or another party may mail a standard purchase receipt printed on paper to the party that maintains the itemized receipt tracking system. In such a case, it will be understood that the itemized receipt tracking system having the flow 100 is configured to create one or more electronic representations of that itemized receipt and/or coordinate with another system(s) to do the same.

It will also be understood that the order of the events described in blocks 120 and 130 in FIG. 1 is merely exemplary and may vary. For example, the itemized receipt tracking system may post the electronic representation of the itemized receipt to an account accessible to the consumer before, after, or substantially simultaneous with creating and/or storing an electronic representation of the itemized receipt in memory.

As will be described in more detail herein, an itemized receipt tracking system having the general process flow 100 described in FIG. 1 may solve a number of problems. For example, many embodiments provide an efficient mechanism by which consumers can electronically store and/or manage itemized receipts. In this regard, some embodiments of a system having the flow 100 save consumers the hassle of storing their own receipts and helps them avoid the frustration of not being able to find a particular receipt when needed. Indeed, some embodiments of a system having the flow 100 may be particularly useful for performing common financial tasks, such as balancing a checkbook, filing taxes, and/or preparing a budget. To assist in these and other endeavors, an itemized receipt tracking system having the flow 100 may be configured to collect and/or track information, including product-level information, from itemized receipts. In some embodiments, the tracking system may be configured to search and retrieve information from itemized receipts based at least partially on a consumer-initiated search query. In addition, some embodiments of a system having the flow 100 may also be used in connection with an online banking or other network-accessible financial account, so that the consumer has broad access to his or her itemized receipts and/or other forms of transaction data. For example, in one embodiment, a system having the flow 100 is configured to allow a user to upload, store, and/or manage transaction data involving the user via an online banking account accessible to the user.

As another benefit, itemized receipt tracking systems having the flow 100 also gives consumers better visibility into their own expenses. For example, a consumer may use a debit card to purchase a number of different items from a mass retail store for a total amount of $200, which includes groceries for $100, a DVD for $20, motor oil for $15, and a desk chair for $65. Later, when looking at his debit card account statement, it may be difficult for the consumer to remember exactly what was purchased since most consumer account statements only list transaction amount-level information and not product-level information. This absence of product-level information also makes its difficult for the consumer to accurately categorize his expenses. In the example above, the consumer may find it more helpful to know that he spent $100 on food, $20 on entertainment, $15 on transportation, and $65 on office supplies, as opposed to $200 at a mass retail store. To this end, many embodiments of an itemized receipt tracking system having the flow 100 allow consumers to track individual product purchases in addition to information about the transactions in which those products were involved. Additionally, a system having the flow 100 may also be used to give parents better visibility into the types of products their children are purchasing.

Figure 2:
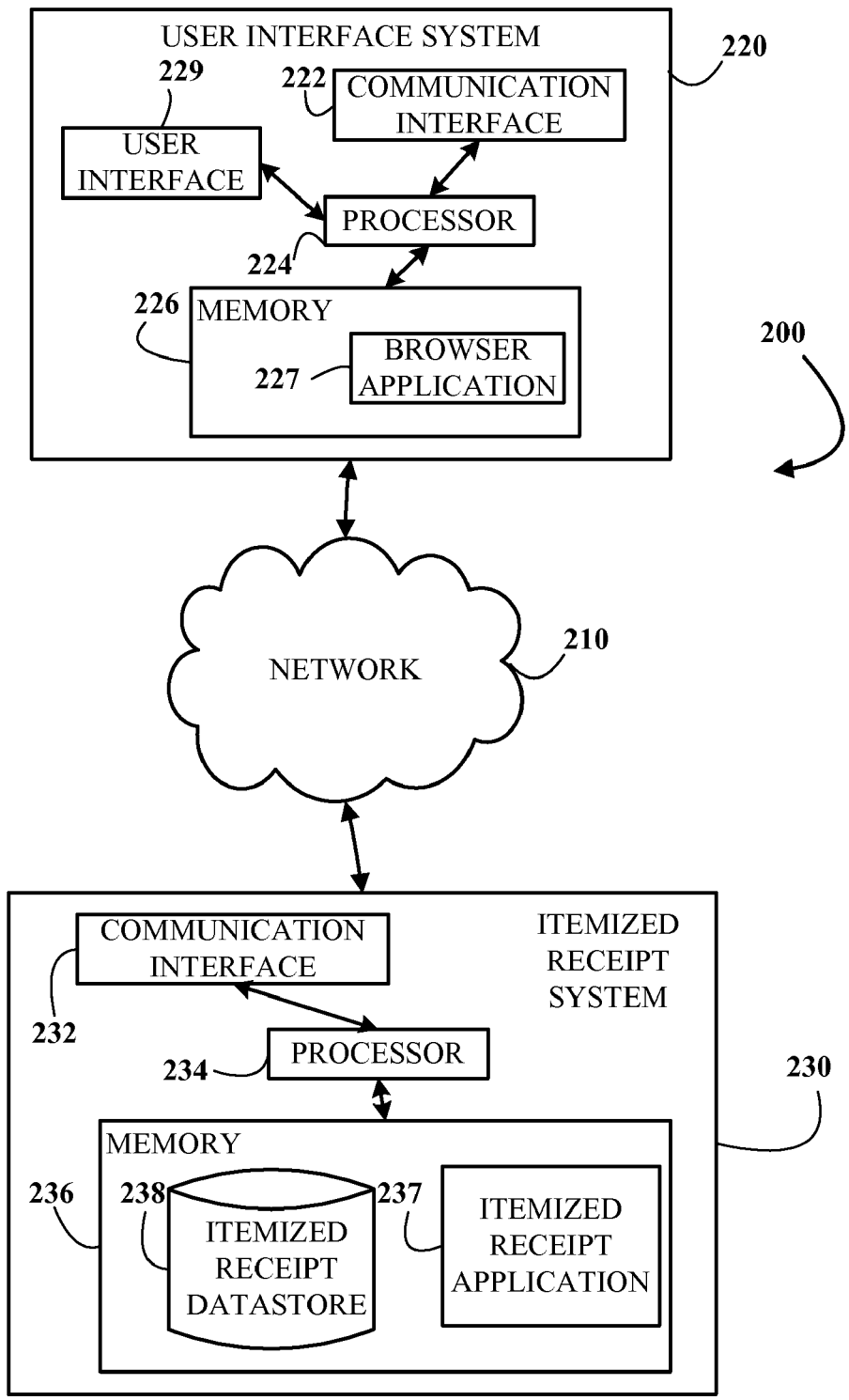
FIG. 2 is a block diagram illustrating technical components of an itemized receipt tracking system, in accordance with an embodiment of the present invention.

Referring now to FIG. 2, an itemized receipt tracking system 200 is provided in accordance with one embodiment of the present invention. The itemized receipt tracking system 200 includes a network 210, a user interface system 220, and an itemized receipt system 230. Each of the portions of the itemized receipt tracking system 200 is operatively coupled to the network 210, which may include one or more separate networks. Additionally, the network 210 may include a local area network (LAN), a wide area network (WAN), and/or a Global Area network (GAN), such as the Internet. It should be understood that the network 210 may be secure and/or unsecure and may also include wireless and/or wireline technology.

In one embodiment, the user interface system 220 is configured to allow a user to communicate with other networks and/or portions of the itemized receipt tracking system 200 and/or vice versa. For example, in one embodiment, the user interface system is a personal computer system and/or mobile phone that a consumer may use to e-mail one or more itemized receipts to the other portions of the itemized receipt tracking system 200. In some embodiments, the user interface system 220 includes a scanner for scanning and communicating itemized receipts printed on paper. In some embodiments, the user interface system 220 includes a particular machine specifically configured to scan and transmit itemized receipts to a bank, such as a device issued to the consumer by the consumer's bank to transmit receipts directly to the bank over a secure network. In another embodiment, the user interface system 220 may be an automated teller machine (ATM) configured to receive one or more itemized receipts, create an electronic representation of the itemized receipt, store the electronic representation in memory, and/or communicate one or more portions of the electronic representation to one or more portions of the itemized receipt tracking system 200.

In another embodiment, the consumer is a bank customer and the user interface system 220 includes an Internet web browser, so that the bank customer may upload an electronic representation of an itemized receipt directly into a portion of the itemized receipt tracking system 200 and/or the bank customer's online banking account. In another embodiment, the user interface system 220 is configured to display a graphical user interface representing an online banking account. The graphical user interface comprises a file-upload field or the like configured to allow a user to select an electronic representation of an itemized receipt from another portion of the user interface system 220 and upload the electronic representation to the online banking account and/or another portion of the itemized receipt tracking system 200. It will be understood that the user interface system 220 may be configured to facilitate real-time or substantially real-time communication between the user and other portions of the itemized receipt tracking system 200.

It will also be understood that, in some embodiments, the user interface system 220 may be operated by a merchant. For example, the user interface system 220 may be a point-of-sale device configured to communicate transaction data, such as an e-receipt, from a sale to the itemized receipt system 230. In another embodiment, the merchant may provide a kiosk that allows the consumer to scan a paper receipt and transmit it to the itemized receipt system 230. Although only a single user interface system 220 is depicted in FIG. 2, it will be understood that the itemized receipt tracking system 200 may include more than one user interface systems. For example, in one embodiment, a merchant may use a user interface system to communicate an e-receipt from a sale to the consumer involved in the sale, and then the consumer may use another user interface system to communicate the e-receipt to the itemized receipt system 230.

In addition to the examples listed above, the user interface system 220 may include, for example, a portion of a computer network, a personal computer system, an automated teller machine (ATM), an Internet web browser, a mobile phone, a personal digital assistant, a public kiosk, a fax machine, and/or some other type of communication device. In one embodiment, as illustrated, the user interface system 220 includes a communication interface 222, a processor 224, a memory 226 having a browser application 227, and a user interface 229. The communication interface 222 is operatively coupled to the processor 224, which is operatively coupled to the user interface 229 and the memory 226 having the browser application 227.

Each communication interface described herein, including the communication interface 222, includes hardware, and, in some instances, software, that enables a portion of the itemized receipt tracking system 200, such as the user interface system 220, to transport, send, receive, and/or otherwise communicate information to and/or from the communication interface of one or more other portions of the itemized receipt tracking system 200. For example, the communication interface 222 of the user interface system 220 may include a modem, server, and/or other electronic device that operatively couples the user interface system 220 to another electronic device, such as the electronic devices that make up the itemized receipt system 230.

Each processor described herein, including the processor 224, includes circuitry required for implementing the audio, visual, and/or logic functions of that portion of the itemized receipt tracking system 200 including the processor. For example, the processor 224 of the user interface system 220 may include a digital signal processor device, a microprocessor device, and various analog-to-digital converters, digital-to-analog converters, and other support circuits. Control and signal processing functions of the user interface system 220 may be allocated between these devices according to their respective capabilities. The processor 224 may include functionality to operate one or more software programs based on computer-executable code portions thereof, which may be stored, for example, in the browser application 227 of the memory 226 of the user interface system 220.

Each memory device described herein, including the memory 226 for storing the browser application 227 and other data, may include any computer-readable medium. For example, the memory 226 of the user interface system 220 may include volatile memory, such as volatile random access memory (RAM) including a cache area for the temporary storage of data. The memory 226 may also include other non-volatile memory, which can be embedded and/or may be removable. The non-volatile memory can additionally or alternatively include an EEPROM, flash memory, or the like. The memory 226 can store any one or more of pieces of information and data used by the user interface system 220 to implement the functions of the user interface system 220.

The browser application 227 may be any computer-executable code portions configured to allow the user interface system 220 to communicate with other devices over a network using, for example, one or more network and/or system communication protocols. For example, in one embodiment, the browser application 227 includes an Internet Web browser used by the user interface system 220 for communicating with various portions of the itemized receipt tracking system 200.

The user interface 229 generally includes one or more user output devices, such as a display and/or speaker, for presenting information to a user. The user interface 229 further includes one or more user input devices, such as one or more keys or dials, a touch pad, touch screen, mouse, microphone, camera, scanner, and/or the like, for receiving information from the user.

Also illustrated in FIG. 2 is an itemized receipt system 230, in accordance with one embodiment of the present invention. The itemized receipt system 230 may include, for example, a portion of a computer network, an engine, a platform, a network server, a database system, a front end system, a back end system, a personal computer system, and/or some other type of computing device. In one embodiment, as illustrated, the itemized receipt system 230 includes a communication interface 232, a processor 234, and a memory 236 having an itemized receipt application 237 and an itemized receipt datastore 238. The communication interface 232 is operatively coupled to the processor 234, which is operatively coupled to the memory 236 having the itemized receipt application 237 and the itemized receipt datastore 238.

In one embodiment, the itemized receipt application 237 includes computer-executable code portions for instructing the processor 234 to store an electronic representation of an itemized receipt in the itemized receipt datastore 238, and/or to post the electronic representation to an account accessible to the consumer. In another embodiment, the itemized receipt application 237 includes computer-executable code portions for instructing the processor 234 to read, collect, organize, and/or store product-level information from transaction data, including, for example, from itemized receipts. In yet another embodiment, the itemized receipt application 237 includes computer-executable code portions for instructing the processor to provide a graphical user interface representing an online banking account, where the graphical user interface includes a file-upload field or the like for uploading transaction data to the online banking account and/or a portion of the itemized receipt tracking system 200.

In one embodiment, the itemized receipt datastore 238 includes one or more rules directed to routing itemized receipts to the proper consumer account. In another embodiment, the itemized receipt datastore 238 includes one or more rules directed to validating product-, transaction amount-, consumer-, and/or merchant-level information found in transaction data against information in an account before assigning the transaction data to that account. In addition, it will be understood that, in at least one embodiment, the itemized receipt datastore 238 provides a substantially real-time representation of the one or more rules contained therein, so that when the processor 234 accesses the itemized receipt datastore 238, the information stored therein is current or substantially current.

It will be understood that the itemized receipt tracking system 200 may be configured to implement any embodiment of the general process flow 100 described herein. For example, according to one embodiment, the itemized receipt system 230 may receive an electronic representation of an itemized receipt from a transaction involving a consumer via the user interface system 220, as represented by the block 210. Then, as represented by the block 220, the itemized receipt system 230 may store the electronic representation of the itemized receipt in memory. As represented by the block 230, the itemized receipt system 230 may also post the electronic representation of the itemized receipt to an account accessible to the consumer.

It should be understood that some or all of the portions of the itemized receipt tracking system 200 may be combined into a single portion, i.e. the user interface system 220 and the itemized receipt system 230 may be combined into a single user interface and itemized receipt system configured to perform all of the same functions of those separate portions as described herein. Likewise, some or all of the portions of the itemized receipt tracking system 200 may be separated into two or more distinct portions, e.g., the itemized receipt system 230 may be separated into a product-level information datastore system and an itemized receipt posting system.

In addition, the various systems of the itemized receipt tracking system 200 may be controlled, operated, managed, stored, and/or maintained, etc. (herein "maintained" for simplicity) by the same or separate parties. For example, in one embodiment, a consumer maintains the user interface system 220, and a bank maintains the itemized receipt system 230. As another example, a financial institution maintains each and every portion of the itemized receipt tracking system 200, including any embodiments of the network 210, user interface system 220, and itemized receipt system 230, as described herein.

Figure 3:
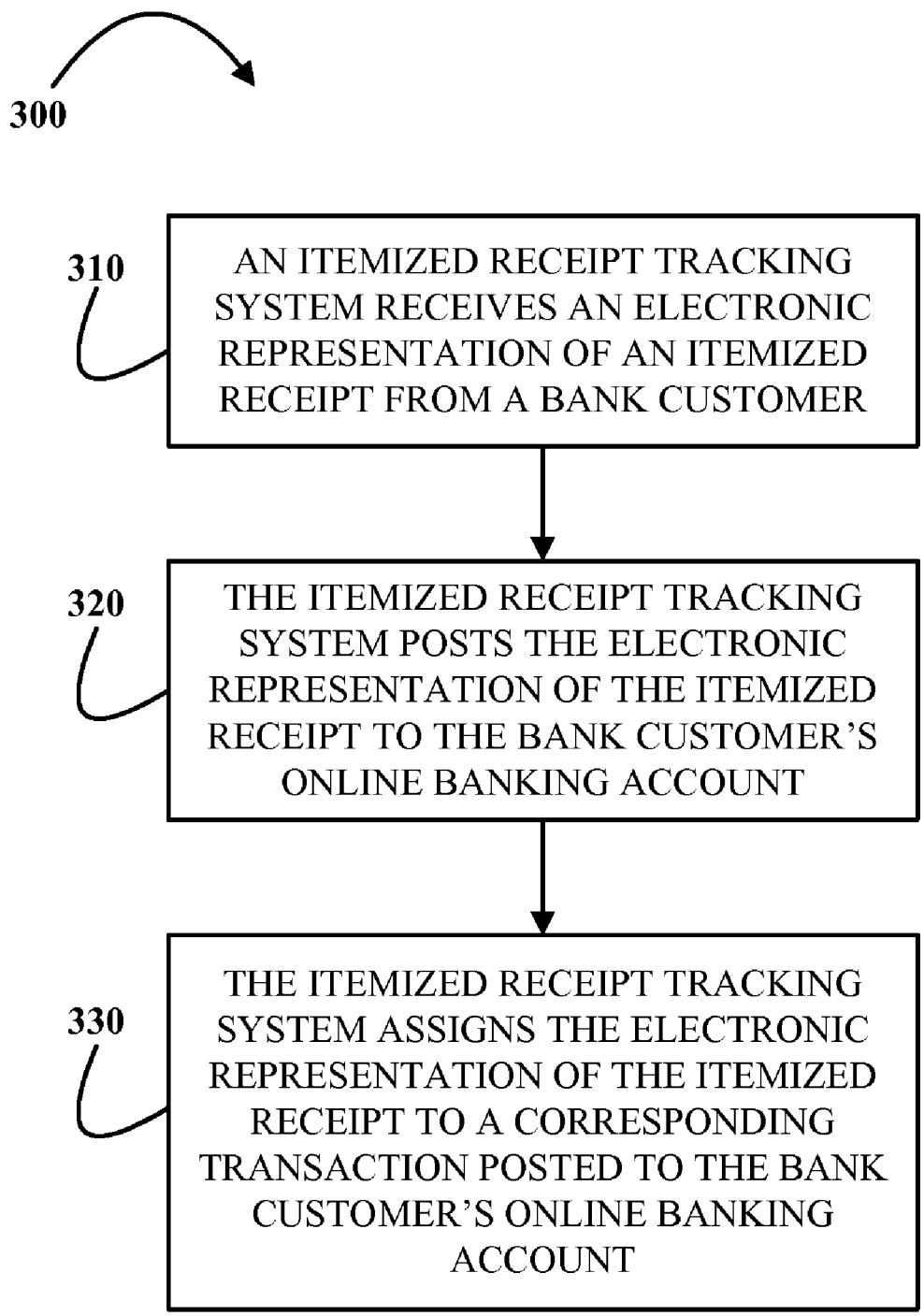
FIG. 3 is a flow diagram illustrating a general process flow of an itemized receipt tracking system, in accordance with an embodiment of the present invention.

Referring now to FIG. 3, an exemplary flow diagram illustrating a general process flow 300 of an itemized receipt tracking system is provided, in accordance with an embodiment of the present invention. In this embodiment, a bank maintains the itemized receipt tracking system for the benefit of its customers, but in other embodiments, another entity, association, machine, and/or thing may maintain the itemized receipt tracking system instead. As represented by the block 310, the itemized receipt tracking system receives an electronic representation of an itemized receipt from a bank customer. As represented by the block 320, the itemized receipt tracking system posts the electronic representation of the itemized receipt to the bank customer's online banking account. Additionally, as represented by the block 330, the itemized receipt tracking system assigns the electronic representation of the itemized receipt to a corresponding transaction posted in the bank customer's online banking account.

It will be understood that an itemized receipt tracking system having the flow 300 may receive the electronic representation of the itemized receipt from the bank customer in a number of different ways. In an embodiment where the itemized receipt is printed on paper, the bank customer may use an image scanner to scan the itemized receipt in order to create a digital copy of it on a personal computer system. Then, the bank customer may log in to his online banking account and upload the digital copy of the itemized receipt directly into his online banking account. For example, the online banking account may include an "Upload receipts" field and/or button that the bank customer may use to browse, locate, and upload electronic representations of itemized receipts from a personal computer, mobile phone, public kiosk, or similar communication device and/or computerized apparatus. In one embodiment, the receipts are kept in an online receipts "vault," which may be a page, folder, tab, column, and/or other central location in the customer's online banking account. In still another embodiment, the online receipts vault may comprise a location outside of the customer's online banking account, such as a website assigned to the customer by the bank or the like.

In another embodiment, the online banking account may include an "Assign receipts" function that the bank customer may use to associate an uploaded itemized receipt to a particular transaction posted to the account. In another embodiment, an itemized receipt tracking system having the flow 300 provides the customer an opportunity to view the receipt, for example, by selecting a "Show receipt" button proximate the transaction to which the receipt corresponds. In another embodiment, there may be a field for uploading an itemized receipt near the posted transaction to which the receipt corresponds.

In another embodiment involving an itemized receipt printed on paper, the bank may provide a facsimile number to bank customers who wish to fax their itemized receipts to the itemized receipt tracking system having the flow 300. In another embodiment, the bank may provide an electronic mail (e-mail) address to customers who wish to e-mail electronic representations of their itemized receipts, such as by personal computer or mobile phone, to the itemized receipt tracking system having the flow 300. In still another embodiment, the bank may provide one or more ATMs configured to receive itemized receipts printed on paper and communicate the itemized receipt itself and/or any information in the itemized receipt to the itemized receipt tracking system having the flow 300. These receipts may be associated with particular transactions posted to the customer's online banking account by bank staff, by a computer system configured to read machine-readable transaction identifying information from the receipt to automatically associate the receipt with a particular transaction in the customer's account, by the customer using the customer's online banking account, and/or via other systems and methods. In one embodiment, the ATM may actually comprise one or more portions of an itemized receipt tracking system itself, according to one of the embodiments described herein.

In still other embodiments, the bank customer may receive an itemized e-receipt from the merchant involved in the transaction. In such a case, the bank customer may, for example, upload or e-mail the e-receipt to the itemized receipt tracking system. In another embodiment, the merchant involved in the transaction may communicate the e-receipt directly to the itemized receipt tracking system having the flow 300 on behalf of the bank customer. It will be understood that an itemized receipt tracking system having the flow 300 is configured, in other embodiments, to receive itemized receipts in formats other than and/or in addition to itemized e-receipts.

It will be understood that, in one embodiment, an itemized receipt tracking system having the flow 300 is configured to read the merchant-level information, product-level information, transaction amount-level information, bank customer-level information, and/or any other information in or about an itemized receipt in order to assign the receipt to a corresponding posted transaction. For example, most financial institutions post debit card transactions in their customers' accounts using a limited amount of information about the transaction, which usually includes only the date of the transaction, the date the transaction posted to the account, the merchant name, and the total amount of the purchase. Thus, in one embodiment of the present invention, the itemized receipt tracking system is configured to read receipts for one or more portions of this information. As one example, an itemized e-receipt from an Apple® retail store typically has the name "Apple®" somewhere in the receipt. Accordingly, the itemized receipt tracking system may be configured to read this information from the itemized e-receipt, locate the last posted transaction in the bank customer's account from an Apple® store, and assign the itemized e-receipt to that transaction.

In another embodiment, the itemized receipt tracking system may be configured to recognize registered trademarks, such as those assigned Apple, Inc., and assign itemized receipts to corresponding transactions based at least partially on that information. In yet another embodiment, an itemized receipt tracking system having the flow 300 is configured to read the total transaction amount in the itemized receipt in order to match it to the corresponding transaction in the bank customer's account. This embodiment may be particularly useful when the bank customer has more than one posted transaction from the same merchant. In some embodiments, the receipt has a unique transaction number, authorization code, and/or other code that can be used by the system to automatically associate the receipt with a transaction record having the same code.

It will also be understood that an itemized receipt may be assigned to a posted transaction in a number of ways. For example, an itemized receipt tracking system having the flow 300 may display a thumbnail view of an itemized receipt in the bank customer's online banking account near the transaction to which the itemized receipt corresponds. In another embodiment, a path, such as a link, is displayed near the transaction to which the itemized receipt corresponds. Following the path will display the receipt in any one or more of the known methods for doing so, including, for example, as a thumbnail view in the same browser, as a full-screen view in a separate browser, as a PDF file, as an html file, etc. In yet another embodiment, the transaction itself is displayed as a link in the bank customer's online banking account, so that the bank customer may follow the link to view the corresponding itemized receipt.

According to another embodiment, an itemized receipt tracking system having the flow 300 stores and/or displays some or all of the bank customer's itemized receipts in a central location in the bank customer's online banking account. The bank customer may then access that central location, view the itemized receipts, and/or manually assign them to the transactions to which they correspond. For example, a bank customer's online banking account may include a "Receipts inbox" for displaying those itemized receipts that have been received by an itemized receipt tracking system having the flow 300, but have not been assigned. In this example, the bank customer may navigate to the "Receipts inbox", view one or more itemized receipts, and/or drag and drop them to the posted transactions to which they correspond.

In a further embodiment, an itemized receipt tracking system having the flow 300 is configured to collect information from an itemized receipt and post that information to the bank customer's online banking account. For example, a bank customer may receive an itemized receipt from a sporting goods store after using his bank credit card to purchase a fishing pole for $25, a basketball for $15, and an outdoor grill for $75. In such a case, the itemized receipt tracking system may be configured to collect the product-level information described in the itemized receipt—e.g., "fishing pole, $25; basketball, $15; outdoor grill, $75"—and post that product-level information to the bank customer's online banking account. In one embodiment, the bank customer may view this product-level information proximate the corresponding transaction posted in the customer's account. In another embodiment, the bank customer may have to follow a link to view those product-level details.

In a further embodiment, the itemized receipt tracking system may be configured to categorize product-level information within the bank customer's online banking account, so that the bank customer can view his expenditures by category. For example, the itemized receipt tracking system may be configured to assign one or more spending identifiers, such as "entertainment", "food", "transportation", etc., to the product-level information and/or assign the product-level information to one or more spending categories based at least partially on the one or more spending identifiers. In another embodiment, the itemized receipt tracking system may be configured to search and/or retrieve product-level information from itemized receipts and/or anywhere in the online banking account based on a consumer-initiated search query. In one embodiment, for example, the bank customer may search for product-level information by keyword, merchant name, spending identifier, and/or spending category.

As with the flow 100 of FIG. 1, it will be understood that the order of the events described in the blocks 310, 320, and 330 in FIG. 3 is merely exemplary and may vary. For example, an itemized receipt tracking system having the flow 300 may post the itemized receipt in the bank customer's online banking account before, after, or substantially simultaneous with assigning the itemized receipt to a corresponding posted transaction.

It will further be understood that the various embodiments of general process flow 300 described herein may be implemented by an embodiment of the itemized receipt tracking system 200 of FIG. 2. In one embodiment, for example, a bank customer uses the user interface system 220 to e-mail an itemized e-receipt to the itemized receipt system 230 maintained by the bank, where it is received by the communication interface 232, as represented by the block 310 in FIG. 3. As represented by the block 320, the itemized receipt application 237 then instructs the processor 234 to post the itemized e-receipt to the bank customer's online banking account stored in the itemized receipt datastore 238 and/or another system. In addition, as represented by the block 330, the itemized receipt application 237 is also configured to instruct the processor 234 to assign the itemized e-receipt to a corresponding transaction posted to the bank customer's online banking account.

Figure 4:
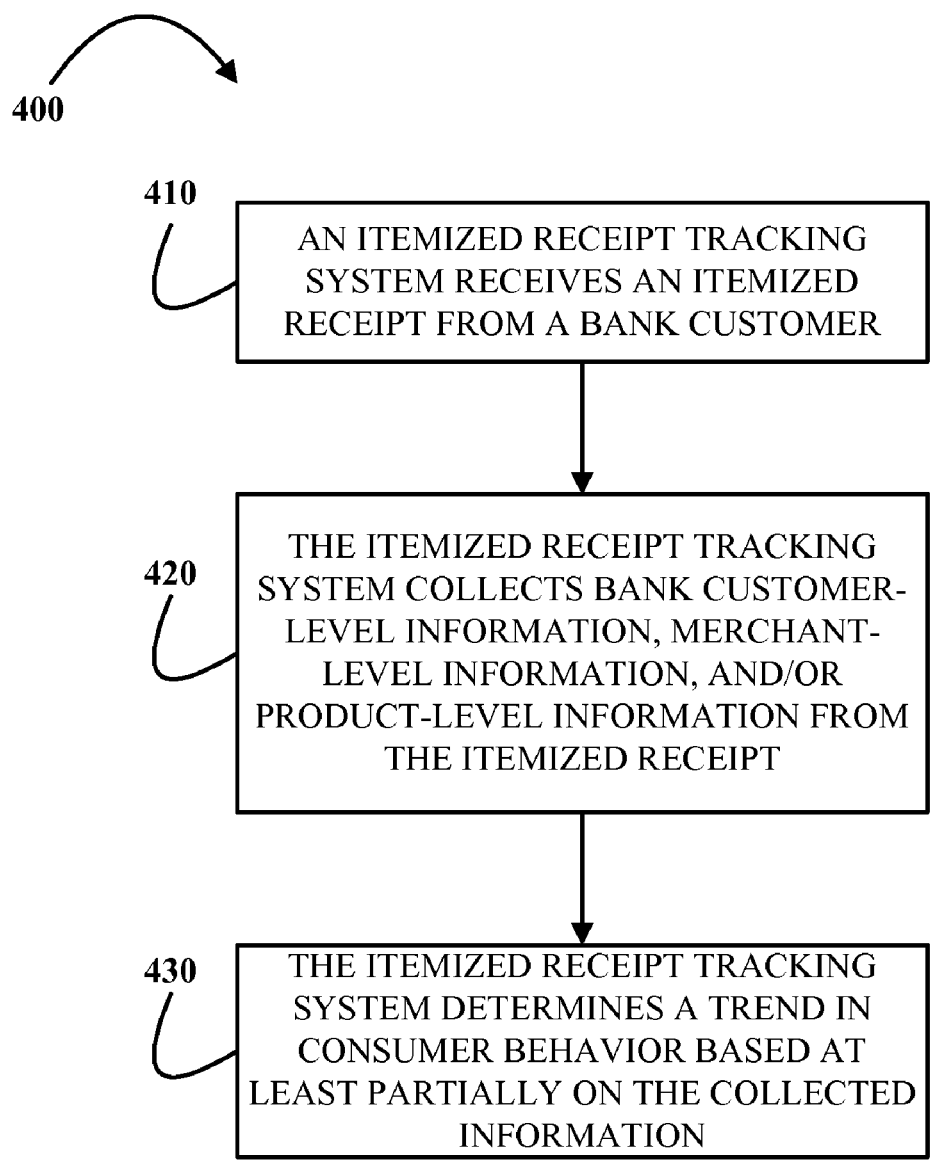
FIG. 4 is a flow diagram illustrating a general process flow of an itemized receipt tracking system, in accordance with an embodiment of the present invention.

Referring now to FIG. 4, an exemplary flow diagram illustrating a general process flow 400 of an itemized receipt tracking system is provided, in accordance with one embodiment of the present invention. In this embodiment, as with the embodiment illustrated in FIG. 3, a bank maintains the itemized receipt tracking system for the benefit of its customers. As represented by the block 410, the itemized receipt tracking system receives an itemized receipt from a bank customer, and, as represented by the block 420, collects the bank customer-level information, merchant-level information, and/or product-level information from the itemized receipt. Then, as represented by the block 430, the itemized receipt tracking system determines a trend in consumer behavior based at least partially on the collected information. In one embodiment, an itemized receipt tracking system having the flow 400 communicates the collected information from the itemized receipt and/or the determined trends in consumer behavior to other systems, entities, and/or associations, either a part of or separate from the bank.

In some embodiments, the trends in consumer behavior are determined only with respect to the bank customer. For example, information from the itemized receipts may show that the bank customer bought a car wash from a gas station only twice in an entire year. As another example, the itemized receipts may show that 40% of the time the bank customer bought coffee from a coffee shop, the bank customer also purchased muffin in the same transaction. As another example, information from the itemized receipts may show that the bank customer never went to a movie theater more than three miles from his residence. It should be understood that information from the bank customer's other financial accounts may be used in connection with the bank customer's itemized receipts to help determine trends in the bank customer's behavior. For example, information from the bank customer's checking account in combination with the bank customer's itemized credit card receipts may show that the bank customer likely spends more than $200 dollars over the course of a weekend if the bank customer receives a paycheck on the Friday before the weekend begins.

In other embodiments, the trends in consumer behavior are determined with respect to more than one bank customer. For example, itemized receipts from several bank customers may indicate that 80% of bank customers typically bought school supplies from a name-brand mass retailer, but then went to a discount retailer to purchase a school bag. As another example, itemized receipts may suggest that retailers in the southern portion of the United States sell 500% more ice cream than in the northern portion. As yet another example, itemized receipts may suggest which brand and style of shoes sell best in name-brand stores as opposed to discount stores. Additionally, as mentioned above, bank customers' other financial accounts may be used in connection with their itemized receipts to determine trends in bank customer behavior. For example, the itemized receipt tracking system may determine that 80% of bank customers use non-bank credit cards to make purchases on credit instead of using bank credit cards.

This and other information regarding trends in consumer behavior will be valuable to the bank customer, the bank, and to merchants. With respect to the bank customer, for example, the itemized receipt tracking system may be configured to graphically display and/or categorize the bank customer's credit card spending to help the bank customer, for example, prepare a monthly budget and/or reduce credit card debt. Alternatively, in another embodiment, an itemized receipt tracking system having the flow 400 may be configured to allow the bank customer to categorize the product-level information in the itemized receipt based on predetermined budget allocations. In a further embodiment, the itemized receipt tracking system may be configured to alert the bank customer to adverse trends in the bank customer's spending behavior in order to help remedy unwanted spending habits. For example, an itemized receipt tracking system having the flow 400 may be configured to send a text message to the bank customer's mobile phone when the bank customer spends more than the average of all other bank customers in certain categories of expenditures, such as transportation, entertainment, food, etc.

In addition, the bank would also benefit from having this information regarding trends in consumer behavior. For example, the services described herein would help the bank increase its own customer base and drive more current bank customers to online banking. A move towards digitizing receipts and/or storing receipts in a digital format would also conform with current "green" trends of reducing the use of paper to improve the environment. As another example, these services would also assist the bank in generating additional revenue since it could charge merchants a fee for the information determined by the itemized receipt tracking system.

Further, merchants may be particularly interested in the information collected from itemized receipts since they can use it to more effectively target consumers. Most large retailers have the ability to conduct analytics research to determine trends in consumer behavior, but most of this information is limited only to the retailers' own stores. With information from the itemized receipt transaction system, large retailers and other merchants would have better visibility into broader and more diverse consumer populations. In addition, the itemized receipt transaction system is also particularly useful for small businesses who cannot afford to do analytics research on their own. These merchants could pay the bank to do their research for them. In addition, the bank could also do their advertising. As one example, the bank could provide its bank customers with merchant coupons for products that the customers regularly purchase, in return for claiming a fee from those merchants.

It will be understood that the various embodiments of the general process flow 400 described herein may be implemented by one or more embodiments of the itemized receipt tracking system 200 of FIG. 2. For example, in one embodiment, a bank customer uses the user interface system 220 to e-mail a scanned copy of an itemized receipt to itemized receipt system 230 maintained by the bank, where it is received by the communication interface 232, as represented by the block 410 in FIG. 4. The itemized receipt application 237 then instructs the processor 234 to collect the bank customer-level, merchant-level, and/or product-level information from the scanned copy of the itemized receipt, as represented by the block 420. Further, the itemized receipt application 237 instructs the processor 234 to determine a trend in consumer behavior based at least partially on the collected information, as represented by the block 430. In one embodiment, the itemized receipt application 237 may be configured to instruct the processor 234 to use the communication interface 232 to communicate the information collected from the itemized receipt to one or more systems maintained by the bank and/or another party.

It will be understood that embodiments of the flow 400 may be integrated with any of the various embodiments of the flows 100 and/or 300 and/or vice versa. For example, in one embodiment, a bank customer receives an itemized receipt printed on paper from a transaction involving the bank customer and a merchant. Then, the bank customer takes a photograph of the receipt with a mobile phone camera and texts the photograph to the itemized receipt tracking system, as represented by the block 310. The itemized receipt tracking system then posts the photograph to the bank customer's online banking account, as represented by the block 320, and then collects the product-level information from the photographed receipt, as represented by the block 420. Further, the itemized receipt tracking system then determines a trend in consumer behavior based at least partially on the collected information, as represented by the block 430.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A method comprising:
receiving an itemized receipt from a transaction involving a consumer, wherein the itemized receipt comprises product-level information, and wherein the consumer is a customer of a bank;
storing the product-level information in memory;
posting, using a processor, the product-level information to an online banking account that is controlled by the bank and accessible to the consumer; and
assigning, using a processor, the product-level information to a corresponding transaction posted to the online banking account.

2. The method of claim 1, wherein the itemized receipt comprises merchant-level information and the corresponding transaction comprises merchant-level information, and wherein assigning the product-level information to the corresponding transaction posted to the online banking account further comprises:
assigning the product-level information to the corresponding transaction based at least partially on a comparison of the merchant-level information in the itemized receipt to the merchant-level information in the corresponding transaction.

3. The method of claim 1, wherein the itemized receipt comprises transaction amount-level information and the corresponding transaction comprises transaction amount-level information, and wherein assigning the product-level information to the corresponding transaction posted to the online banking account further comprises:
assigning the product-level information to the corresponding transaction based at least partially on a comparison of the transaction amount-level information in the itemized receipt to the transaction amount-level information in the corresponding transaction.

4. The method of claim 1, wherein posting the product-level information to the online banking account further comprises:
posting the product-level information proximate to the corresponding transaction.

5. The method of claim 1, wherein the itemized receipt comprises a physical receipt printed on paper.

6. The method of claim 1, wherein receiving the itemized receipt further comprises:
receiving the itemized receipt from the consumer.

7. The method of claim 1, further comprising:
determining a trend in consumer behavior based at least partially on the product-level information.

8. The method of claim 1, wherein storing the product-level information in memory further comprises:
storing the product-level information in memory such that a record is created of specific products purchased by the consumer over a period of time.

9. The method of claim 1, further comprising:
organizing the product-level information in the online banking account by spending category.

10. The method of claim 1, wherein the product-level information comprises one or more codes that uniquely identify one or more products involved in the transaction.

11. The method of claim 1, wherein the product-level information comprises at least one of a product description, a product quantity, or a product price.

12. The method of claim 1, wherein posting the product-level information to the online banking account further comprises:
posting, proximate to the corresponding transaction, a path to view at least one of the product-level information or the itemized receipt.

13. The method of claim 1, wherein posting the product-level information to the online banking account further comprises:
configuring the corresponding transaction as a path to view at least one of the product-level information or the itemized receipt.

14. The method of claim 1, further comprising:
collecting, using a processor, the product-level information from the itemized receipt.

15. The method of claim 1, wherein the itemized receipt comprises an electronic representation of the itemized receipt.

16. The method of claim 1, wherein posting the product-level information to the online banking account further comprises:
posting, proximate to the corresponding transaction, an electronic representation of the itemized receipt.

17. The method of claim 1, wherein receiving the itemized receipt further comprises:
receiving an electronic representation of the itemized receipt via the online banking account.

18. The method of claim 17, wherein receiving the electronic representation of the itemized receipt via the online banking account further comprises:
receiving, at the online banking account, the electronic representation of the itemized receipt, wherein the electronic representation of the itemized receipt has been uploaded from a computer to the online banking account using a file-upload field included in the online banking account.

19. A system comprising:
a communication interface configured to receive an itemized receipt from a transaction involving a consumer, wherein the itemized receipt comprises product-level information, and wherein the consumer is a customer of a bank; and
a processor operatively connected to the communication interface and configured to:
post the product-level information to an online banking account that is controlled by the bank and accessible to the consumer; and
assign the product-level information to a corresponding transaction posted to the online banking account.

20. The system of claim 19, wherein the itemized receipt comprises a physical receipt printed on paper.

21. The system of claim 19, wherein an automated teller machine (ATM) comprises the communication interface.

22. The system of claim 19, wherein the itemized receipt comprises merchant-level information and the corresponding transaction comprises merchant-level information, and wherein the processor is configured to assign the product-level information to the corresponding transaction based at least partially on a comparison of the merchant-level information in the itemized receipt to the merchant-level information in the corresponding transaction.

23. The system of claim 19, wherein the itemized receipt comprises transaction amount-level information and the corresponding transaction comprises transaction amount-level information, and wherein the processor is configured to assign the product-level information to the corresponding transaction based at least partially on a comparison of the transaction amount-level information in the itemized receipt to the transaction amount-level information in the corresponding transaction.

24. The system of claim 19, wherein the processor is configured to post the product-level information to the online banking account by posting the product-level information proximate to the corresponding transaction.

25. The system of claim 19, wherein the processor is configured to post the product-level information to the online banking account by posting, proximate to the corresponding transaction, a path to view at least one of the product-level information or the itemized receipt.

26. The system of claim 19, wherein the processor is configured to post the product-level information to the online banking account by configuring the corresponding transaction as a path to view at least one of the product-level information or the itemized receipt.

27. The system of claim 19, wherein the processor is further configured to collect the product-level information from the itemized receipt.

28. The system of claim 19, wherein the processor is further configured to determine a trend in consumer behavior based at least partially on the product-level information.

29. The system of claim 19, wherein the processor is further configured to organize the product-level information in the online banking account by spending category.

30. The system of claim 19, wherein the itemized receipt comprises an electronic representation of the itemized receipt.

31. The system of claim 19, wherein the communication device is configured to receive the itemized receipt from the consumer.

32. The system of claim 19, wherein the processor is configured to post the product-level information to the online banking account by posting, proximate to the corresponding transaction, an electronic representation of the itemized receipt.

33. The system of claim 19, wherein the communication interface is configured to receive the itemized receipt by receiving an electronic representation of the itemized receipt via the online banking account.

34. The system of claim 33, wherein the communication interface is configured receive the electronic representation of the itemized receipt via the online banking account by receiving, at the online banking account, the electronic representation of the itemized receipt, wherein the electronic representation of the itemized receipt has been uploaded from a computer to the online banking account using a file-upload field included in the online banking account.

35. A computer program product comprising a computer-readable storage medium having computer-executable program code portions stored therein, the computer-executable program code portions comprising:
    a first program code portion configured to receive an itemized receipt from a transaction involving a consumer, wherein the itemized receipt comprises product-level information, and wherein the consumer is a customer of a bank;
    a second program code portion configured to store the product-level information in memory;
    a third program code portion configured to post the product-level information to an online banking account controlled by the bank and accessible to the consumer; and
    a fourth program code portion configured to assign the product-level information to a corresponding transaction posted to the online banking account.

36. The computer program product of claim 35, wherein the third program code portion is configured to post the product-level information to the online banking account by posting the product-level information proximate to the corresponding transaction.

37. The computer program product of claim 35, wherein the third program code portion is configured to post the product-level information to the online banking account by posting, proximate to the corresponding transaction, an electronic representation of the itemized receipt.

38. The computer program product of claim 35, wherein the first program code portion is configured to receive the itemized receipt by receiving an electronic representation of the itemized receipt via the online banking account.

39. The computer program product of claim 35, wherein the itemized receipt comprises a physical receipt printed on paper.

40. The computer program product of claim 35, wherein the itemized receipt comprises an electronic representation of the itemized receipt.

41. The computer program product of claim 35, wherein the first program code portion is configured to receive the itemized receipt from the consumer.

42. The computer program product of claim 35, further comprising:
    a fifth program code portion configured to collect the product-level information from the itemized receipt.

43. The computer program product of claim 35, wherein the third program code portion is configured to post the product-level information to the online banking account by posting, proximate to the corresponding transaction, a path to view at least one of the product-level information or the itemized receipt.

44. The computer program product of claim 35, wherein the third program code portion is configured to post the product-level information to the online banking account by configuring the corresponding transaction as a path to view at least one of the product-level information or the itemized receipt.

45. The computer program product of claim 35, further comprising:
    a fifth program code portion configured to organize the product-level information in the online banking account by spending category.

\* \* \* \* \*